Dec. 11, 1945.  T. LAMB  2,390,544
HANDLE
Filed Jan. 1, 1944
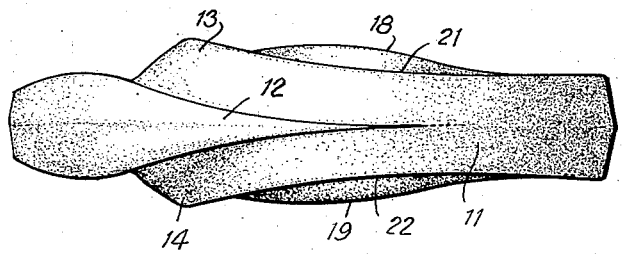
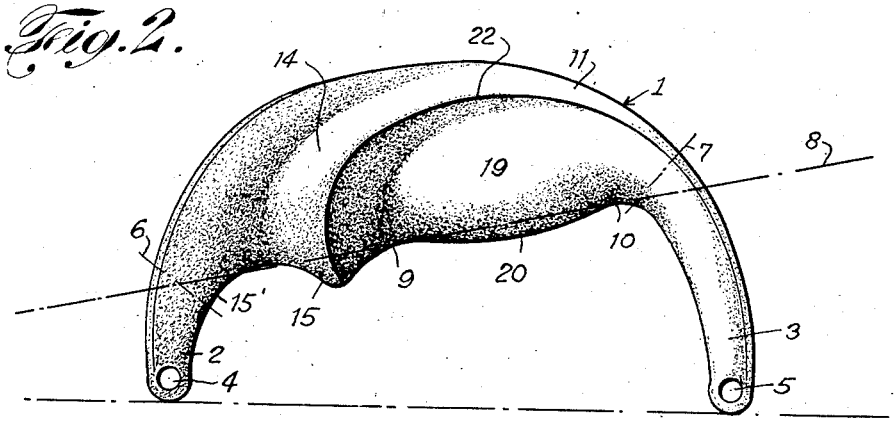
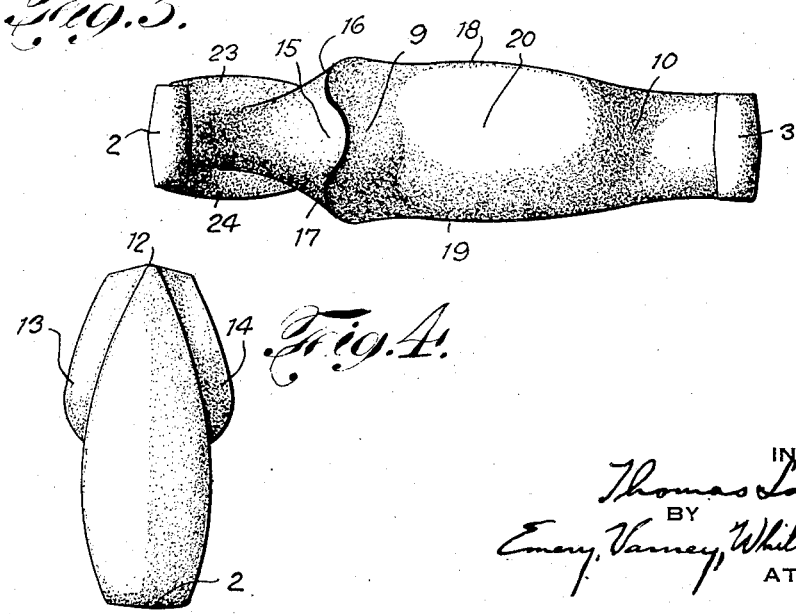
INVENTOR
Thomas Lamb
BY
Emery, Varney, Whittemore & Dix
ATTORNEY Patented Dec. 11, 1945

2,390,544

UNITED STATES PATENT OFFICE 2,390,544

HANDLE

Thomas Lamb, New York, N. Y.

Application January 1, 1944, Serial No. 516,729

6 Claims. (Cl. 16—126)

This invention relates to handles or hand grips adapted for use in connection with many articles which are lifted, pulled, pushed ar otherwise manipulated by hand, as for example, luggage, hand tools, flat irons, firearms, coffee pots and many other articles.

It is an object of the invention to provide a handle so designed with relation to the average human hand and arm as to provide comfortable, natural gripping surfaces which tend to distribute and equalize gripping tensions and thereby relieve strain and reduce fatigue in use.

Other objects and adavntages of the invention will appear hereinafter.

A preferred embodiment of the invention selected for purposes of illustration is shown in the accompanying drawing, in which, Figure 1 is a top plan view.
Figure 2 is a side elevation.
Figure 3 is a bottom plan view, and
Figure 4 is a front end elevation.

Referring to the drawing, the invention is illustrated as embodied in a handle adapted for use in connection with an article which is required to be lifted, as for example a piece of luggage such as a suitcase, in which it is customary to provide two points of attachment between the handle and the article. Thus the handle proper, designated generally by the numeral 1 is provided with two depending portions 2 and 3 at the front and rear ends, respectively, which may be provided with apertures 4 and 5 to receive rings or any other suitable connecting fitting for attachment to the article. However, it will be understood that the depending portions 2 and 3, as shown, are merely illustrative of one form of connection between the handle proper and the article and that the conformation of such depending portions are not an essential part of the invention. For example, in handles for flat irons the connecting portion at the front end of the handle might be thickened for rigid attachment to the body of the iron, and the connecting portion at the rear end of the handle might be omitted entirely. In the latter case the rear end of the handle may be faired off in any suitable conformation. Therefore, in order to distinguish between what I have called the handle proper and such connecting portions, I have shown dot and dash lines 6 and 7 which approximate the dividing lines therebetween.

In studying the human hand in connection with the present invention I have discovered if the fingers of the hand are closed about a small cylindrical rod while the wrist is held straight with respect to the forearm, the rod will assume an angle of between 100° and 110° to the axis of the forearm, measured from the end of the rod nearest the thumb. That is, if the forearm is held vertical, for example, the rod will be tilted downwardly with the end nearest the thumb lower than the other end, and making an angle of between 10° and 20° to the horizontal. This is because of the varying length of the fingers of the hand, the arrangement of the knuckle joints, etc.

Accordingly, in the handle of the invention the axis of the handle is inclined with respect to the plane of the surface to which it is attached, hereinafter called the plane of reference, which in the present case is a horizontal plane passing through the apertures 4 and 5. For purposes of measurement, the axis of the handle may be taken to be established by the dot and dash line 8 drawn tangent to the concave curved surfaces 9 and 10 which receive the middle finger and little finger, respectively, of the hand. The angle between the axis so established and the plane of reference should be between 10° and 20° and preferably in the neighborhood of 15°.

The upper portion of the handle is provided with a smoothly curved slightly convex surface 11 adapted to engage the "heel" of the hand. At its forward end said surface is divided by a wedge shaped partition 12 and the diverging surfaces 13 and 14 curve forwardly and downwardly to engage the thumb and forefinger. Beneath the lower front ends of the surfaces 13 and 14 is a curved transverse surface 15 more or less conical in shape, which engages the end of the forefinger, the said surface 15 being separated from the surfaces 13 and 14 by rather abrupt curves 16 and 17. At its forward end the surface 15 merges into a downwardly curved surface 15' leading toward the depending portion 2.

Extending downwardly from the surface 11 the handle has smoothly curved, slightly convex side surfaces 18 and 19 which curve inwardly and meet to form a bottom surface 20 having the concave curved surfaces 9 and 10 at the ends thereof as previously referred to. The surfaces 18, 19 and 20 engage the palm of the hand and the last three fingers, with the middle finger engaging the surface 9 and the little finger engaging the surface 10. The surfaces 18 and 19 are separated from the surface 11 by ridges 21 and 22 which extend forwardly and downwardly, and also separating the surfaces 18 and 19 from the surfaces 13 and 14, respectively. Finally the ridges 21 and 22 curve inwardly to meet at the center, thus separating the transverse surface 15 from the bottom surfaces.

The wedge shaped partition 12 previously referred to provides oppositely disposed wing surfaces 23 and 24 curved outwardly and following the outward and downward contour of the diverging surfaces 13 and 14, and adapted to engage the sides of the thumb and forefinger and to serve as guides during turning or twisting movements, thus preventing slipping.

As shown, the handle is adapted for use by either the right or left hand, the gripping surfaces being symmetrically arranged.

It will be understood that the invention may be variously modified and embodied within the scope of the subjoined claims.

I claim as my invention:

1. A handle for an article, said handle having a smoothly curved slightly convex upper surface adapted to engage the heel of the hand, the forward end of said surface being divided by a wedge shaped partition to form two diverging surfaces curving forwardly and downwardly and adapted to engage the thumb and forefinger.

2. A handle for an article, said handle having a smoothly curved slightly convex upper surface adapted to engage the heel of the hand, the forward end of said surface being divided by a wedge shaped partition to form two diverging surfaces curving forwardly and downwardly and adapted to engage the thumb and forefinger, and a curved surface below the lower forward ends of said diverging surfaces joining the spaced ends of said diverging surfaces in rather abrupt curves and adapted to engage the end of the forefinger.

3. A handle for an article, said handle having a smoothly curved slightly convex upper surface adapted to engage the heel of the hand, the forward end of said surface being divided by a wedge shaped partition to form two diverging surfaces curving forwardly and downwardly and adapted to engage the thumb and forefinger, said wedge shaped partition having oppositely disposed wing surfaces curved outwardly and following the outward and downward contour of said diverging surfaces and adapted to engage the sides of the thumb and forefinger.

4. A handle for an article, said handle having a smoothly curved slightly convex upper surface adapted to engage the heel of the hand, the forward end of said surface being divided by a wedge shaped partition to form two diverging surfaces curving forwardly and downwardly and adapted to engage the thumb and forefinger, said handle having smoothly curved slightly convex side surfaces extending downwardly and inwardly and meeting to form a bottom surface, said side and bottom surfaces being adapted to engage the palm of the hand and the last three fingers, said side surfaces being separated from said diverging surfaces by ridges extending forwardly and downwardly.

5. A handle for an article, said handle having a smoothly curved slightly convex upper surface adapted to engage the heel of the hand, the forward end of said surface being divided by a wedge shaped partition to form two diverging surfaces curving forwardly and downwardly and adapted to engage the thumb and forefinger, and a curved transverse surface below the lower forward ends of said diverging surfaces joining the spaced ends of said diverging surfaces in rather abrupt curves and adapted to engage the end of the forefinger, said handle having smoothly curved slightly convex side surfaces extending downwardly and inwardly and meeting to form a bottom surface, said side and bottom surfaces being adapted to engage the palm of the hand and the last three fingers, said side surfaces being separated from said diverging surfaces by ridges extending forwardly and downwardly, and said bottom surface being separated from said transverse surface by a ridge joining and connecting said first named ridges.

6. A handle for an article, said handle having a smoothly curved slightly convex upper surface adapted to engage the heel of the hand, the forward end of said surface being divided by a wedge shaped partition to form two diverging surfaces curving forwardly and downwardly and adapted to engage the thumb and forefinger, and a curved surface below the lower forward ends of said diverging surfaces joining the spaced ends of said diverging surfaces in rather abrupt curves and adapted to engage the end of the forefinger, the axis of the handle being inclined at an angle of between 10° and 20° to the plane of reference of the article to which the handle is attached.

THOMAS LAMB.